United States Patent [19]

Yoneda et al.

[11] Patent Number: 5,200,823
[45] Date of Patent: Apr. 6, 1993

[54] VIRTUAL CHANNELS FOR A MULTIPLEXED ANALOG COMPONENT (MAC) TELEVISION SYSTEM

[75] Inventors: Robert Yoneda; Keith Gammie; Wayne Sheldrick, all of Ontario, Canada

[73] Assignee: Scientific-Atlanta, Inc., Atlanta, Ga.

[21] Appl. No.: 677,555

[22] Filed: Mar. 29, 1991

[51] Int. Cl.⁵ .................. H04N 7/08; H04N 7/04
[52] U.S. Cl. .................. 358/146; 358/147; 358/145
[58] Field of Search ............ 358/145, 143, 144, 142, 358/141, 14, 86, 146, 147; 380/21

[56] References Cited

U.S. PATENT DOCUMENTS

| | | |
|---|---|---|
| 3,245,157 | 4/1966 | Laviana . |
| 4,163,254 | 7/1979 | Block et al. .................. 358/84 |
| 4,225,884 | 9/1980 | Block et al. .................. 358/84 |
| 4,484,217 | 11/1984 | Block et al. .................. 358/84 |
| 4,486,897 | 12/1984 | Nagai .................. 381/2 |
| 4,652,903 | 3/1987 | Lucas .................. 358/11 |
| 4,866,770 | 9/1989 | Seth-Smith et al. .................. 380/20 |
| 4,890,319 | 12/1989 | Seth-Smith et al. .................. 380/20 |
| 4,890,321 | 12/1989 | Seth-Smith et al. .................. 380/20 |
| 4,908,859 | 3/1990 | Bennett .................. 380/10 |
| 5,003,384 | 3/1991 | Durden et al. .................. 358/84 |

FOREIGN PATENT DOCUMENTS 8102961  10/1981  World Int. Prop. O. .......... 358/145

OTHER PUBLICATIONS

Gassmann, G. G., "Twelve Sound Channels During the Vertical Sync Interval of the Television Signal", IEEE Trans. Broadcast and Television Receivers, USA vol. BTR-16, No. 4 (Nov. 1970), pp. 318-324.

Primary Examiner—James J. Groody
Assistant Examiner—Safet Metjahic
Attorney, Agent, or Firm—Banner, Birch, McKie & Beckett

[57] ABSTRACT

A decoder for use in a television system. The decoder includes a receiver for receiving a television signal having at least one channel. Each channel of the television signal includes video and audio components. A channel maps the channel received by the receiver to a plurality of virtual channels. A first virtual channel utilizes a first combination of video and audio components of the received channel and a second virtual channel utilizes a second combination of video and audio components of the same received channel different than the first combination. A selector allows a subscriber to select one of the virtual channels. Linked text pages may also be mapped to one or more of the virtual channels.

9 Claims, 12 Drawing Sheets

FIG. 13

| VIRTUAL CHANNEL | SERVICE | "REAL" CHANNEL (TRANSPONDER) | SUB-SERVICE |
|---|---|---|---|
| 001 | SUPERSTATION | 04 | TV LANG 1 |
| 002 | SPORTS | 09 | TV LANG 1 |
| 006 | MUSIC VIDEOS | 07 | TV LANG 1 |
| 010 | PPV FIRST RUN MOVIES | 03 | TV LANG 1 |
| 024 | SPORTS, SPANISH | 09 | TV LANG 2 |
| 026 | PPV FIRST RUN MOVIES, SPANISH | 03 | TV LANG 2 |
| 046 | CLASSICAL MUSIC, STEREO | 09 | RADIO 1 |
| 047 | COUNTRY MUSIC, STEREO | 04 | RADIO 1 |
| 048 | CALL-IN TALK SHOW, MONO | 04 | RADIO 2 |
| 094 | WEATHER, SOUTHERN CALIF | 03 | TEXT PG 164 |
| 095 | WEATHER, NYC AREA | 03 | TEXT PG 192 |
| 099 | STOCK MARKET HOT TIPS | 08 | TEXT PG 225 |

| VIRTUAL CHANNEL | TRANS. CHANNEL | SERVICE | TYPE | DISABLE | (SUB-Tr) |
|---|---|---|---|---|---|
| 001 | 04 | TV | LANG#1 | 0 | — |
| 002 | 09 | TV | LANG#1 | 0 | — |
| 003 | X | X | X | 1 | — |
| 004 | X | X | X | 1 | — |
| 005 | X | X | X | 1 | — |
| 006 | 07 | TV | LANG#1 | 0 | — |
| 007 | X | X | X | 1 | — |
| 008 | X | X | X | 1 | — |
| 009 | X | X | X | 1 | — |
| 010 | 03 | TV | LANG#1 | 0 | — |
| ⋮ | ⋮ | ⋮ | ⋮ | ⋮ | — |
| 024 | 09 | TV | LANG#2 | 0 | — |
| 046 | 09 | RADIO | STEREO | 0 | — |
| ⋮ | ⋮ | ⋮ | ⋮ | ⋮ | — |

X = DON'T CARE

FIG. 14

| VIRTUAL CHANNEL | 85 | 86 | 87 | 88 | 89 | 90 | 91 | 92 | 93 | 94 |
|---|---|---|---|---|---|---|---|---|---|---|
| PAGE #'S | 0-9 | 10-19 | 20-29 | 30-39 | 40-49 | 50-59 | 60-69 | 70-79 | 80-89 | 90-99 |
| | A-C | D-F | G-I | J-L | M-N | O-Q | R-S | T-U | V-W | X-Z |

FIG. 15

VIRTUAL CHANNELS FOR A MULTIPLEXED ANALOG COMPONENT (MAC) TELEVISION SYSTEM

BACKGROUND OF THE INVENTION

1. Field of the Invention

The present invention generally relates to multiplexed analog component (MAC) television systems and, more particularly, to an improved interface between a subscriber and an integrated receiver-decoder (IRD) in a MAC television system.

2. Description of the Relevant Art

For the purposes of the following discussion and this invention, the term "subscriber" means one who is receiving a television service. The "subscriber" could thus be an individual consumer with a decoder in his own home, or could be a system operator such as a local cable TV operator, or a small network operator such as a hotel/motel operator with a central decoder for all televisions in the hotel or motel. In addition, the "subscriber" could be an industrial user, as described in U.S. Pat. No. 4,866,770 assigned to the same assignee as the present application and incorporated herein by reference.

For the purposes of this invention, a network is defined as a program source (such as a pay television provider), an encoder (sometimes called a "head end"), a transmission means (satellite, cable, radio wave, etc.) and a series of decoders used by the subscribers. A system is defined as a program source, an encoder, a transmission means, and a single receiving decoder. The system model is used to described how an individual decoder in a network interacts with the encoder.

A MAC color television signal is illustrated in FIG. 1, which is an amplitude-vs.-time diagram of a single video line of 63.56 microseconds duration. The first 10.9 microseconds is the horizontal blanking interval (HBI) 22, in which no picture information is transmitted. Following HBI 22 are chrominance signal 24 and luminance signal 26, either of which may be time-compressed. Between chrominance signal 24 and luminance signal 26 is a 0.28 microsecond guard band 28, to assist in preventing interference between the two signals.

The MAC color television signal of FIG. 1 is obtained by generating conventional luminance and chrominance signals (as would be done to obtain a conventional NTSC or other composite color television signal) and then sampling and storing them separately. Luminance is sampled at a luminance sampling frequency and stored in a luminance store, while chrominance is sampled at a chrominance sampling frequency and stored in a chrominance store. The luminance or chrominance samples may then be compressed in time by writing them into the store at their individual sampling frequency and reading them from the store at a higher frequency. A multiplexer selects either the luminance store or the chrominance store, at the appropriate time during the active video line, for reading, thus creating the MAC signal of FIG. 1. Audio samples may be transmitted during the HBI; these are multiplexed (and may be compressed) in the same manner as the video samples. The single rate at which all samples occur in the MAC signal is called the MAC sampling frequency.

FIG. 2 shows a prior art conditional-access system for satellite transmission. In encoder 101, the source program information 102 which comprises video signals, audio signals, and data is scrambled in program scrambler 103 using a key from key memory 104. The scrambling techniques used may be any such techniques which are well known in the art. The key can be a signal or code number used in the scrambling process which is also required to "unlock" or descramble the program in program descrambler 108 in decoder 106. In practice, one key can be used (single layer encryption) or more than one key (not shown). The key is usually changed with time (i.e.—monthly) to discourage piracy. The scrambled programs and the key are transmitted through satellite link 105, and received by conditional-access decoder 106. Decoder 106 recovers the key from the received signal, stores it in key memory 107 and applies it to program descrambler 108 which descrambles the scrambled program received over satellite link 105, and outputs unscrambled program 109.

FIG. 3 shows the overall transmission format of a MAC system. As is conventional in television, 30 "frames" each comprising a still image are transmitted per second as indicated. Each frame includes two "fields," as also shown. In a preferred embodiment of the invention, the video encoding scheme employed is that referred to generally as "B-MAC." This is an acronym for type B format, Multiplexed Analog Component system. "Type B" refers to the fact that data is carried integral to the video signal. See generally Lowry, "B-MAC: An Optimum Format for Satellite Television Transmission," *SMPTE Journal*, November 1984, pp. 1034–1043, incorporated herein by reference, which discusses in detail the B-MAC format and explains why it was chosen over various competing systems.

The vertical blanking interval (VBI) of each field contains certain "system data" necessary for operation of a subscription television system as well as addressed packets and teletext lines used to carry data needed for the operation of individual decoders and for transmission of messages to individual subscribers. Preferably, the vertical blanking intervals of 16 total fields are used for complete transmission of all system data required, which includes an encryption key which is changed every 16 fields, that is, on the order of three times per second. As also shown in FIG. 3, each line also includes a horizontal blanking interval (HBI). During the HBI are transmitted six channels of high quality digitally-encoded audio information, with error correction, such that the decoder can also be used to supply a high quality audio signal. This can be used to provide the audio component of the corresponding video signal (or several versions thereof, in different languages) or an additional audio signal, such that subscription audio is also made available according to the system of the invention.

FIG. 4 shows the format of the horizontal blanking interval (HBI). The HBI perferably consists of 78 total bits of pulse amplitude modulated data. The HBI is interposed between vertical blanking interval or video information from a previous line and that of the present line. A typical horizontal blanking interval as shown begins with a two-bit guard band 30, followed by 45 bits of audio and utility data 32, a second two-bit guard band 34, twenty bits of color burst information 36, a further guard band 38, six more bits of data 40 and a final guard band 42, after which the VBI or the video signal of the particular frame commences. The position of the color burst 30 within the HBI varies, to provide signal scrambling. Descrambling involves the use of a repetitively-transmitted key.

FIG. 5 shows some additional details of the horizontal blanking interval data 32 and 40 shown in FIG. 4. In the example shown, fifty-one total bits of data are provided in each line of the HBI, and each bit is pulse amplitude modulated encoded, such that each bit period includes transmission of two bits. One bit can be referred to as sign and the other as magnitude as indicated on FIG. 5. As shown, the first seventy-eight bits are digital audio. Thus each frame provides a thirteen-bit digital representation of a sample of each of six audio channels. High quality transmission of audio frequencies up to approximately 15 kHz is thus provided. Following the audio information are six bits of stepsize and bandwidth information. The stepsize bits indicate the size of the steps numbered by the thirteen bits of information preceding, and the bandwidth information relates to the amount of the amount of emphases or de-emphasis of the signal employed. Alternate fields carry the stepsize and bandwidth data. Both these terms are used as conventional in the Dolby delta modulation scheme, which is employed in the preferred embodiment of this invention for transmission of the audio. Following are twelve bits of error correction code (ECC) for correction of the audio, indicated at 48. Four utility bits follow at 50, and the last bit 52 of the data are a parity check bits for checking the parity of the error correction bits 48.

FIG. 6 shows the arrangement of the lines which make up the vertical blanking interval (VBI). The VBI includes 16 lines in the 525-line NTSC version of this invention. A slightly different number of lines are used in the 625-line PAL. The functions of the lines and their arrangement in other respects are identical.

As indicated, the vertical blanking interval is 377 bits wide. These bits are pulse amplitude modulated FSK scheme used in the HBI as discussed above. Lines 1, 2 and 3 includes the transmission of clock recovery, synchronization and system service, as indicated in FIG. 6.

For the purposes of the present invention, the significant data contained in line 3 is a system key which is updated every sixteen fields, that is, which changes with each complete system data transmission as indicated above in connection with FIG. 3. The system key is common to all decoders. The system key is contained in the service data of line 3, and is used for decryption of video program material, audio and teletext.

Lines 4-8 of the VBI include the addressed packets, as indicated by reference numeral 62. As noted, these each contain an address which is then followed by data, concluding with error correction coding (ECC). The addresses are those of the individual decoders. The addresses in the address packets are transmitted in clear text, such that they can be received without decryption by the receiver. The remainder of the message is encrypted. In this way, addressed packet data, which is, very significant to the proper functioning of the system because one of the addressed packets includes one of the decrypting ciphers needed, is provided with a high degree of security. Addressed packets addressed to differing decoders may be transmitted in a single field.

As indicated at 64, lines 9-13 of the VBI are used to transmit teletext. The first part of each teletext line is a teletext identification which indicates that the line in fact is teletext. As shown, two types of teletext lines are used. Teletext headers include a relatively larger number of flags, and indicate which of the following teletext lines are part of a particular "page" or message. The text lines themselves include a somewhat lesser number of flags and text data. Typically, forty ASCII-encoded bytes are sent per text line, and up to twenty lines can be displayed on the user's screen at once.

FIG. 7 shows in some additional detail the make-up of line 3. It begins with the seventy-eight symbols of HBI data indicated at 72, followed with a bit which is not used, and a number of message bits, each of which is immediately followed by a parity bit. The message bits shown in line 3 of FIG. 7 are each repeated three times and are each protected by parity bits, such that of some 378 total bits, only sixty-two bits of useful data are provided. This data comprises the "system data" used by the subscription television system of the invention to keep control of a wide variety of system functions. Three different versions of line 3 are required to transmit all the system data needed, and each is transmitted in five successive fields, such that the total system data transmission consumes fifteen total field transmissions. A sixteenth field is not used for transmission of system data. The fact that the system data transmitted in line 3 includes a service key which is changed every 16 frames, i.e., on the order of three times per second. This service key must, of course, be accurately received for the decoder to work properly. Therefore, it is transmitted redundantly and in combination with extensive parity-based error correction to ensure correct reception of the service key, as well as the other system data.

The key contained in line 3 is also used to unscramble the location of the color burst signal occurring during the HBI, which varies from the exemplary position shown in FIG. 4.

Teletext is transmitted in a bipartite format. Teletext is transmitted in the form of a number of text lines or rows, making up a page of text. The rows making up the page are preceded in transmission by a teletext header. The header indicates the fact that a teletext page follows and indicates its page number. A decoder looking for a particular page number, for example, a template page, scans the teletext page numbers provided in the teletext headers for the particular page of interest. When the page number sought is detected, the decoder then selects the following page, that is, selects for storage all the teletext lines which follow until the next teletext header line is identified.

FIGS. 8 and 9 show respectively the formats of the teletext header and text lines. In FIG. 8, the teletext header 90 is shown as comprising a thirty-two bit teletext identifier 92. This field simply indicates that this particular line of the vertical blanking interval is a teletext line, as opposed to, for example, an addressed packet. The next thirty-two bit area 94 contains various control flags, which are discussed in detail below. The teletext header then contains a 128 bit area 94 contains various control flags, which are discussed in detail below. The teletext header then contains a 128 bit field 96 which identifies the number of the page which is comprised by the following text lines. The page number is a sixteen bit number, each bit of which is encoded as a eight bit byte. The flags 94 are similarly encoded: that is, a flag which is either a "1" or a "0" data value is nevertheless encoded as an eight bit byte for transmission, so as to enable its correct detection more probable than if it were simply a single bit flag. For the same reason, the page number is a 128-bit word in which each eight byte indicates whether the corresponding bit is a 1 or a 0, again for extremely reliable detection of page numbers. Finally, the last 165 bits 98 of the teletext header 90 are not used.

The flags 94 include a header flag 94a which indicates whether the teletext line is a header or is not, a linked page flag 94b indicating whether the subsequent page of teletext is one of a number "linked" or related to the present page, an encrypted page flag 94c indicating whether the subsequent page is encrypted or not, and a box page flag 94d indicating whether the text shown in the subsequent page should be displayed against a video background or a black background.

The significance of the flags is as follows. The header flag 94a simply indicates whether a particular teletext line is a header or is a line of text. The linked page flag 94b is used to signify to the decoder that a subsequent page contains data needed to complete the message begun in the present page. For example, if a teletext message is too long to fit into a single page comprising twenty 40-character lines of text, the user typically will desire to see the subsequent text page. The linked page flag 94b is used to alert the decoder to this fact and to cause it to copy the page of text having the next higher page number into a random access memory, such that if the user then indicates that he wishes to see the subsequent page of text, it already stored in the random access memory. In this way, the entire message can be displayed more or less immediately, as opposed to waiting for a subsequent transmission of succeeding pages, which may not occur for on the order of several minutes in a very busy system. The linked page flag 94b thus provides an opportunity to improve the teletext service to the user. More particularly, any number of pages can be linked to provide lengthy text messages, e.g., stock price quotations or the like, which can efficiently be read in sequence.

The encrypted page flag 94c indicates whether the text found in the subsequent text lines making up a page is encrypted or not. In many cases, of course, there is no reason to encrypt the teletext, for example, the message is not private, or if its loss will not be damaging to the system integrity, as would be, for example, the loss of control over a first-run motion picture or the like. Hence, many teletext lines are not in fact encrypted.

Finally, the box flag page 94d indicates to the decoder that the teletext in a subsequent page is to be superimposed over whatever video is on the screen at the time, instead of being displayed against a plain background. This flag is useful for several purposes. For example, closed-captioned teletext, providing lines of dialogue and the like so that the hearing-impaired can follow the text of a film, is clearly best provided in this way, such that a viewer can simultaneously see the text and the video. On the other hand, important system messages, such as warnings of community dangers and the like, may be more dramatically or effectively presented against a plain background. Hence, this option is provided and is controlled by the box page flag 94d as noted.

FIG. 9 shows the structure of an individual text line 100 up to twenty of which may make up a page of text. As in the case of the teletext header of FIG. 8, the first thirty-two bits 102 of the text line 100 are a teletext identifier. These are identical whether the teletext line is in fact a header or is a text line. The next eight bits are a header flag 103, which is identical to the header flag comprised by flags 94 of the header line 90, that is, it is an eight bite byte indicating that the teletext line is in fact a text line 100 and not a teletext header 90. The following 320 bits are devoted to the transmission of forty bytes of textual data. Typically, these are encoded according to the usual ASCII standards, whereby each byte is seven bits of data plus a parity bit for error detection. Thus, each text line transmits forty characters which may be any alpha-numeric character found in the ASCII character set. The last seventeen bits 108 are not used.

Thus, in practice, the broadcast transmitter transmits a sequence of teletext lines in lines 9-13 of the vertical blanking interval (see FIG. 6). Up to twenty textlines 100 may follow each teletext header 90. The teletext head 90 contains a page number 96 which identifies the following text lines as, for example, belonging to a template useful in displaying billing status, or as including, for example, information concerning the current movie being run, that is, describing its title, its lead characters, it length, and the price the subscriber will be charged for viewing it, or the like. It will be appreciated, therefore, that the teletext lines in any given vertical blanking interval may be all text lines 100, since only five teletext lines can be transmitted in a vertical blanking interval. (It will be appreciated by those skilled in the art that this numerical limitation relates to a 525-line NTSC-type signal; the actual numbers of the lines-in the VBI are different in the PAL type 625-line system.)

A 9600 k baud asynchronous data channel for use, for example, by a personal computer is also transmitted over the MAC signal. Additionally, one or more audio channels may be used for data transmission.

Thus, the MAC signal includes video and up to six audio channels, as well as text and data. Typically, a MAC decoder includes one pair of audio outputs. These outputs are generally dedicated for stereo audio output to accompany the video for a transmitted program. However, since up to six channels of audio output are available, the other four channels may, for example, carry a second language to accompany the video for the transmitted program, radio transmissions, or high speed reassigned data. The availability of these additional audio channels, along with text and data, provides flexibility to system operators. Thus, in prior systems, a subscriber could, for example, listen to a radio station transmitted over transponder channel 4. A transponder is a microwave repeater which receives, amplifies, downconverts and retransmits signals at a communication satellite. To listen to the radio station, the subscriber tuned to channel 4 and actuated a key designated "RADIO" on his or her handheld remote or on a keypad on a front panel of the decoder. A radio menu offering one or more selections would then appear on the screen to invite the subscriber to make a selection, thereby enabling the subscriber to listen to the selected radio station. A text screen identifying the radio station tuned was then displayed. While such an arrangement utilizes the features of a MAC signal, the above-described procedure can be confusing to a subscriber since the video of transponder channel 4 and the audio associated with the radio station, even though transmitted over the same transponder channel, are typically unrelated. Thus, when a subscriber tunes to channel 4 prior to activating the "RADIO" key, video and audio unrelated to the desired radio station are presented. Further, the subscriber must first consult a program guide to find the appropriate transponder channel and then either again refer to the program guide or to a menu and possibly submenus to listen to the radio station.

Other specific details of a prior art conditional access television system may be found in commonly assigned U.S. Pat. No. 4,890,319, incorporated herein by reference.

As noted, the MAC signal may also be utilized to transmit text for display on a subscriber's television. Text screens may, for example, provide weather reports, sports updates, and stock market quotations. Typically, such information is presented on several screens through which a subscriber may page by using, for example, a "NEXT" key. However, if the information is presented on a large number of different screens, a subscriber will need to page through a number of screens to obtain the information he or she is seeking, resulting in delay and frustration.

Thus, although prior systems have utilized the inherent features of a MAC system, present interfaces between the system and a subscriber desiring to use these features can lead to confusion and delay.

SUMMARY OF THE INVENTION

Accordingly, it is an object of the present invention to provide an improved interface between a television system and a subscriber to permit better utilization of the system features.

It is another object of the present invention to provide an improved method of searching for and displaying text pages to a subscriber.

In accordance with the present invention, a decoder for use in a television system is provided. The decoder includes a receiver for receiving a television signal having at least one channel. Each channel of the television signal includes video and audio components. A channel map maps the channel received by the receiver to a plurality of virtual channels. A first virtual channel utilizes a first combination of video and audio components of the received channel and a second virtual channel utilizes a second combination of video and audio components of the same received channel different than the first combination. A selector allows a subscriber to select one of the virtual channels.

Also in accordance with the present invention, an encoder for use in a television system such as a multiplexed analog component (MAC) television system including a plurality of remotely located decoders is provided. The encoder includes a transmitter for transmitting a television signal having at least one channel. Each channel of the television signal includes a video component and an audio component having a plurality of audio channels. A channel map is generated for use by the decoders to map the channel to a plurality of virtual channels. A first virtual channel utilizes a first combination of video and audio components of the transmitted channel and a second virtual channel utilizes a second combination of video and audio components of the same transmitted channel different than the first combination. The encoder includes a mechanism for downloading the channel map to the remote decoders.

Also in accordance with the present invention, a decoder for use in a television system is provided including a receiver for receiving a television signal including a plurality of text pages wherein which are linked such that a first text page is accompanied by information identifying a second text page associated therewith. A channel map maps the text pages to a plurality of virtual channels, each virtual channel having linked text pages mapped thereto in accordance with root text pages defining a first text page on each of the virtual channels and root page spacing defining a number of text pages mapped to each of the virtual channels. A final page of a first virtual channel may be linked to the root page of a second virtual channel. A selector enables a subscriber to select one of the virtual channels.

Also in accordance with the present invention, an encoder for use in a television system including a plurality of remotely located decoders is provided which includes a transmitter for transmitting a television signal comprising a plurality of text pages therein. The text pages are linked such that a first text page is accompanied by information identifying a second text page associated therewith. A channel map is generated for mapping the text pages to a plurality of virtual channels, each virtual channel having linked text pages mapped thereto in accordance with root text pages defining a first text page on each of the virtual channels and root page spacings defining a number of text pages mapped to each of the virtual channels. A final page of a first virtual channel may be linked to the root page of a second virtual channel. The encoder includes a mechanism for downloading the channel map and the root page spacing to the remote decoders.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 13 illustrates the relationship between a plurality of virtual channels and a plurality of transponder channels.

FIG. 14 illustrates a channel map in accordance with the present invention.

FIG. 15 illustrates an arrangement of text pages on a plurality of virtual channels in accordance with the present invention.

DETAILED DESCRIPTION OF THE PREFERRED EMBODIMENTS

The present invention is described below in terms of a B-MAC satellite television system. However, the invention is applicable to other MAC systems such as C-MAC, D-MAC, and D/2-MAC. Further, the invention may also be implemented in NTSC (National Television Standards Committee), PAL, SECAM, or high definition television systems.

Figure 1:
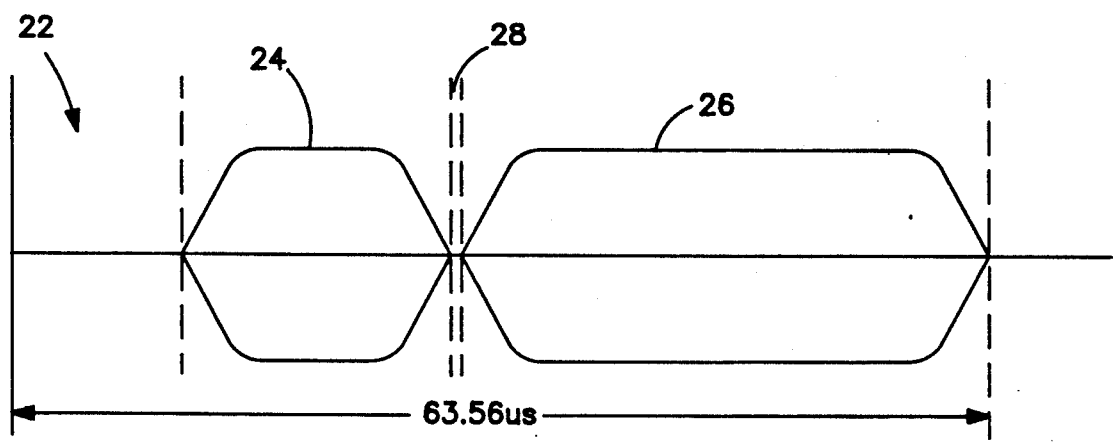
FIG. 1 is an amplitude-vs.-time diagram of a single video line of a typical MAC color television signal.
Figure 2:
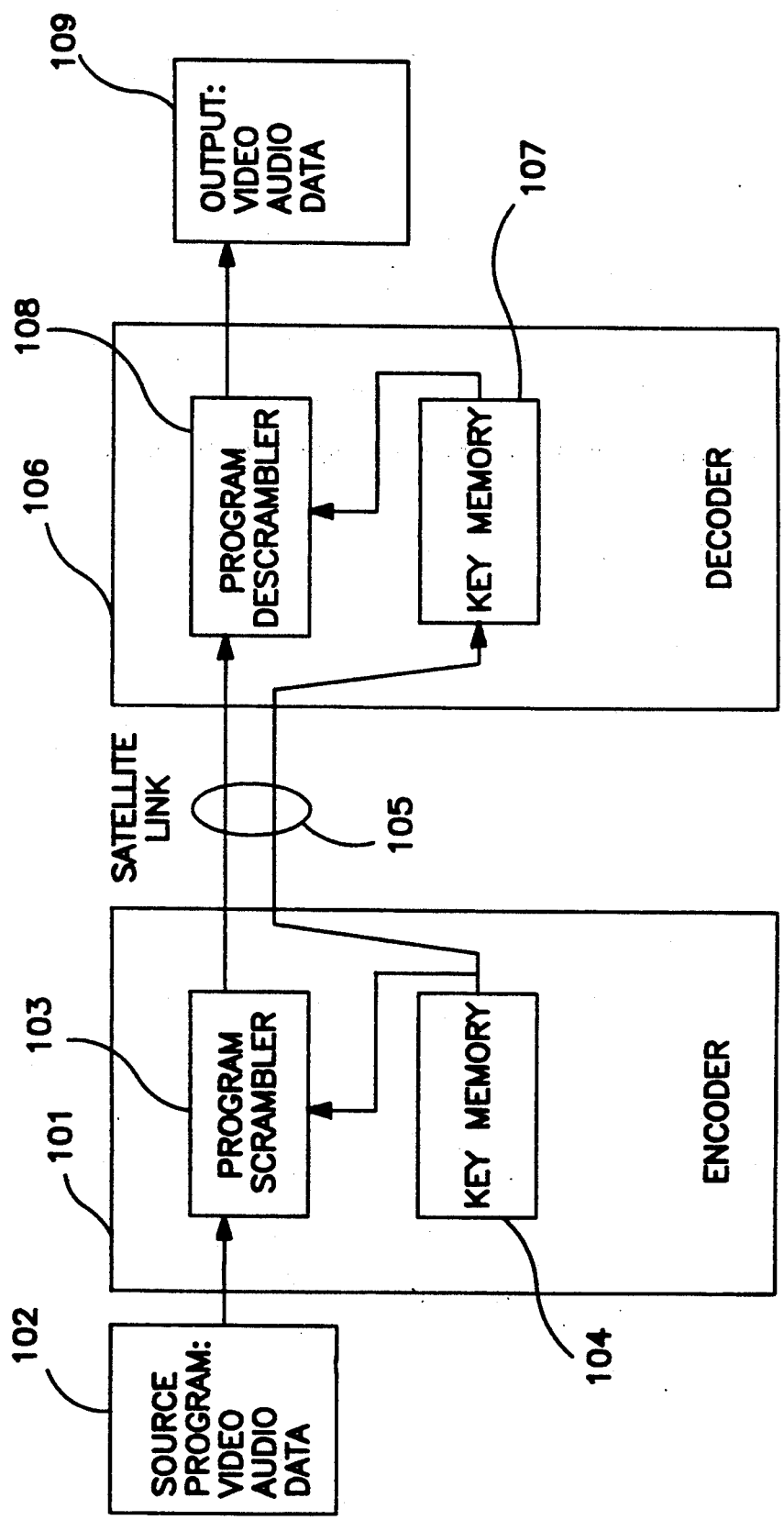
FIG. 2 is block diagram of a prior art satellite television system.
Figure 3:
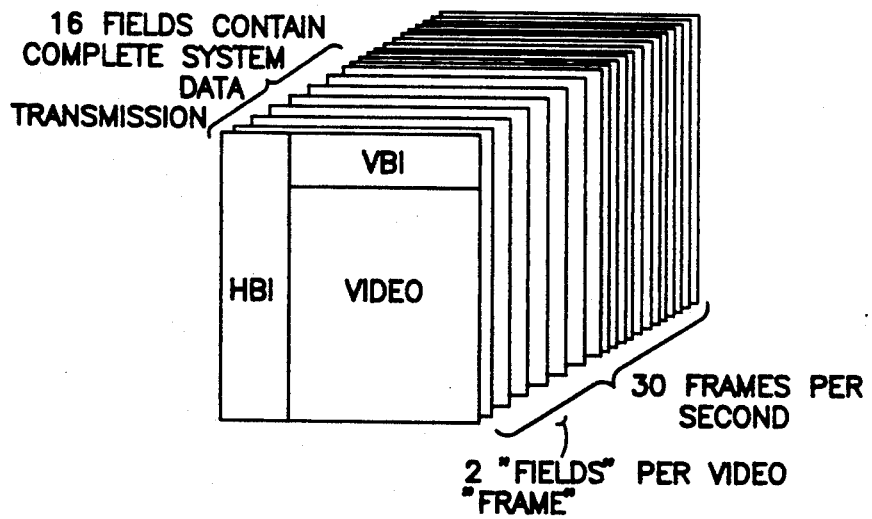
FIG. 3 shows an overall view of the video format according to the invention.
Figure 4:
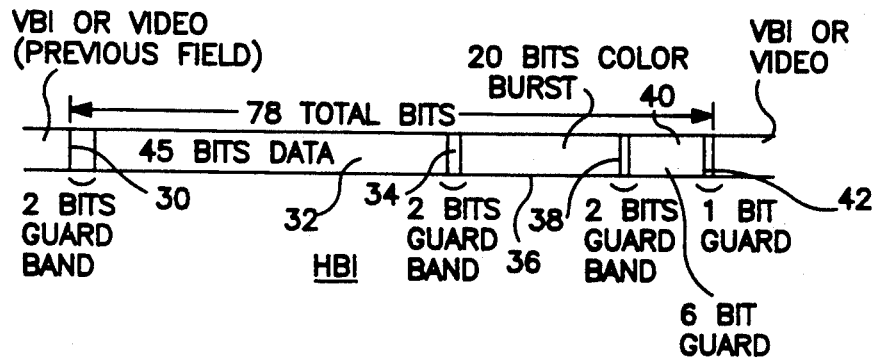
FIG. 4 shows in broad outline the format of the horizontal blanking interval.
Figure 5:
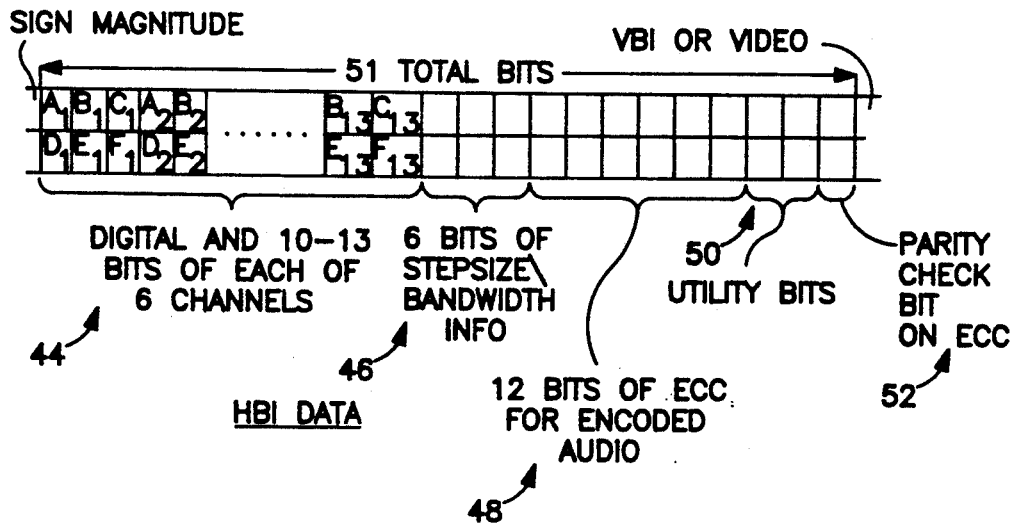
FIG. 5 shows additional details of the format of the horizontal blanking interval.
Figure 6:
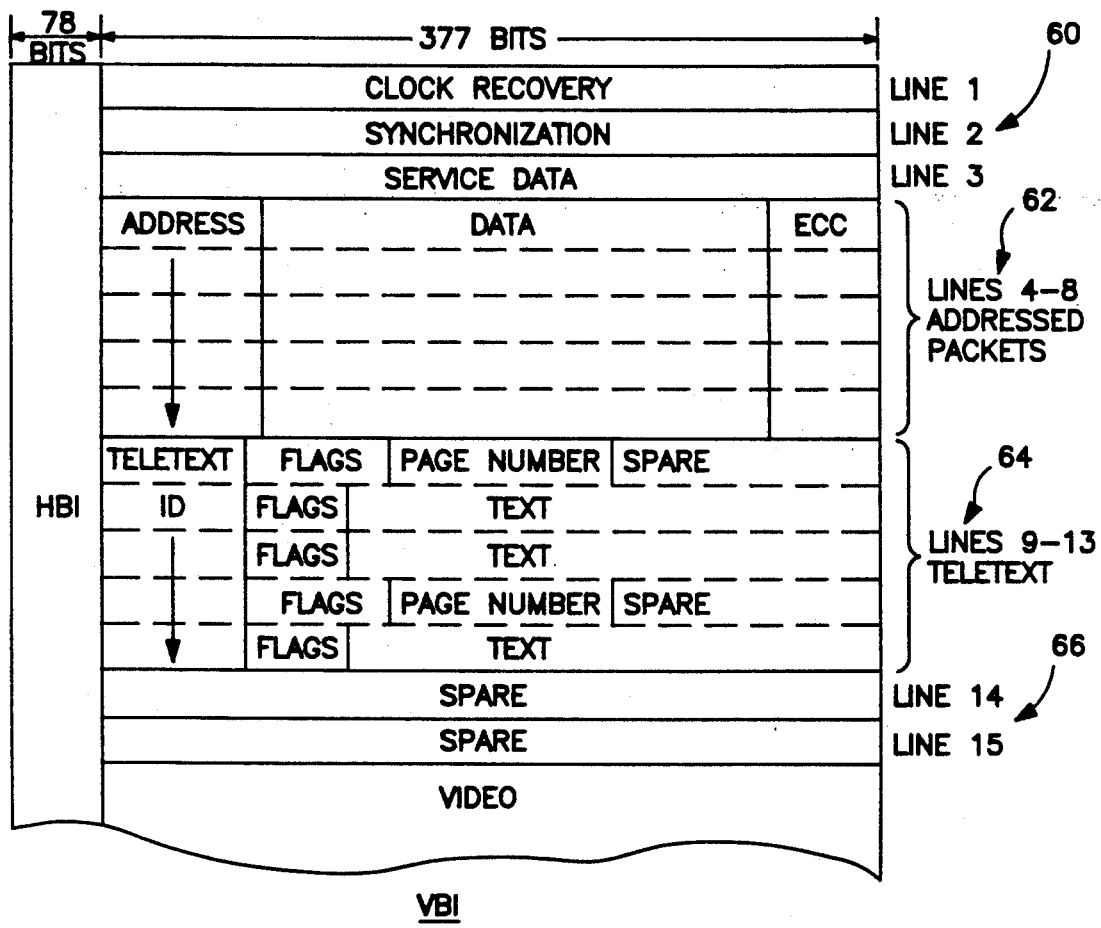
FIG. 6 shows an overview of the material carried in the 16 lines of the vertical blanking interval in a 525 line embodiment of the invention.
Figure 7:
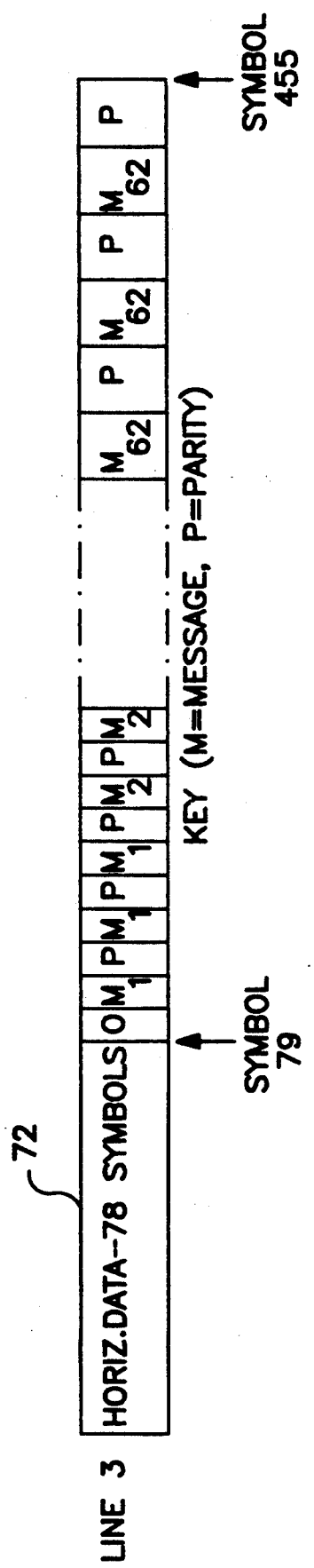
FIG. 7 shows the arrangement of the system data carried in line 3 of the vertical blanking interval.
Figure 8:
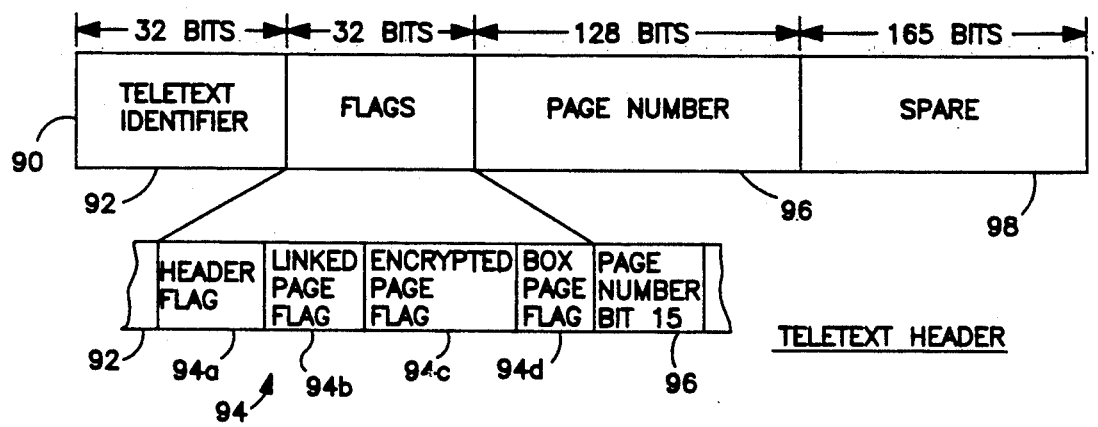
FIG. 8 shows the outline of a teletext header line which can be transmitted in lines 4–8 of the vertical blanking interval.
Figure 9:
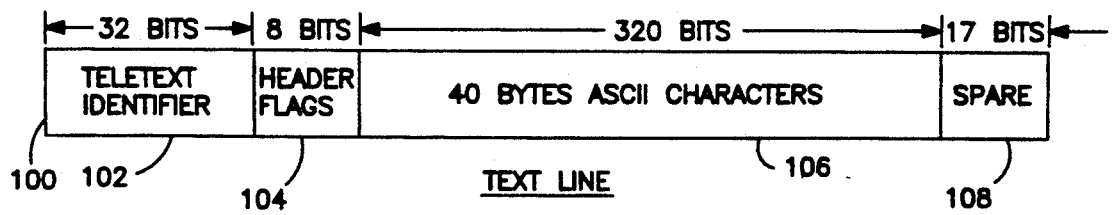
FIG. 9 shows a text line, that is a line of teletext which may be transmitted during any one of lines 9–13 of the vertical blanking interval.
Figure 10:
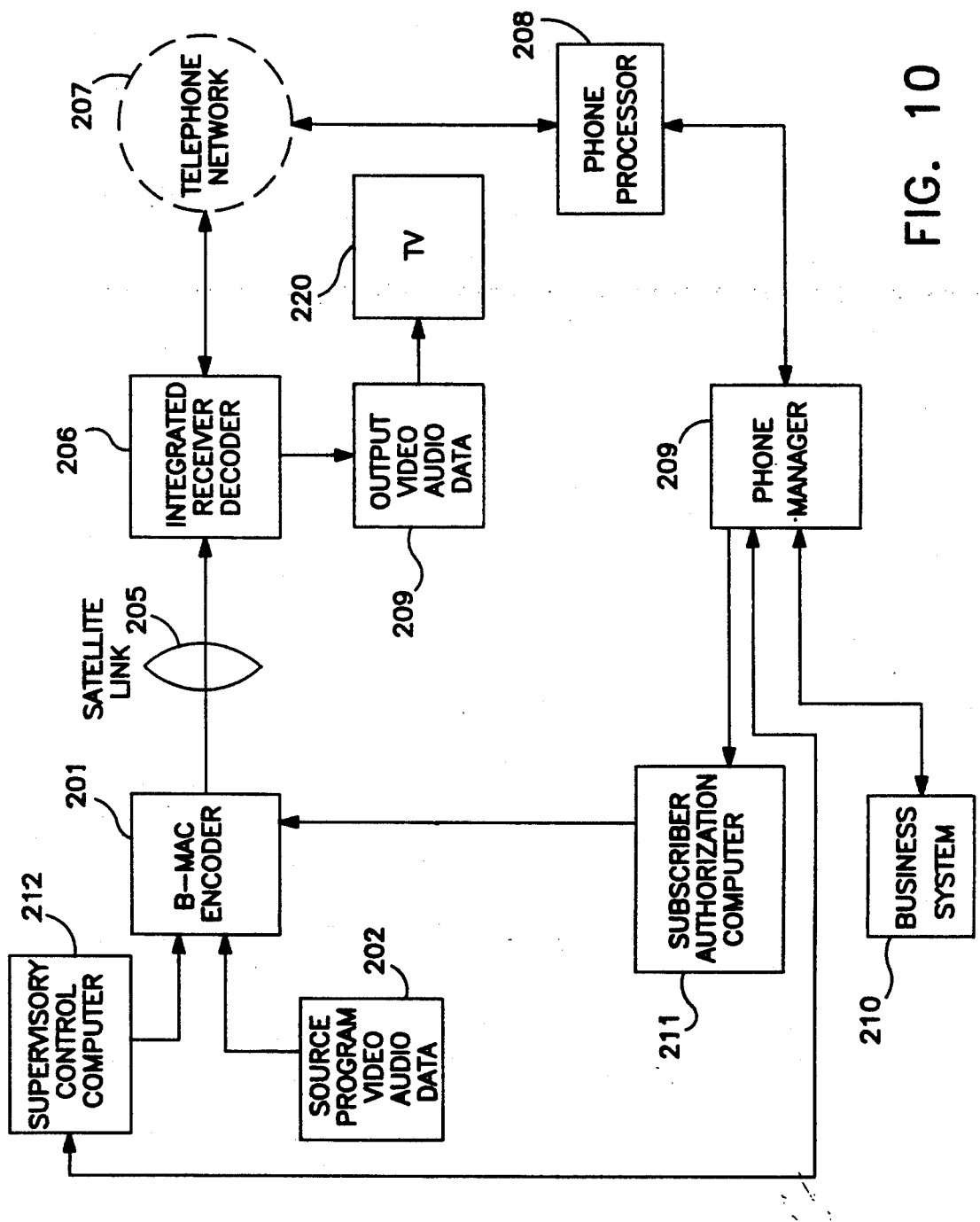
FIG. 10 illustrates a satellite television system in which the present invention may be implemented.

A B-MAC satellite television system in which the the present invention may be implemented is shown in block form in FIG. 10. B-MAC encoder 201 encodes a source program 202 for transmission over a satellite link 205 to an integrated receiver-decoder (IRD) 206. Program source 202 may include video, audio, and data information. The source program information is scrambled in a program scrambler of B-MAC encoder 201 using a key (as discussed above). The scrambled programs and key are transmitted through satellite link 205. IRD 206 receives the scrambled programs and key. The key is recovered from the received signal, stored in a key memory and applied to a program descrambler which descrambles the scrambled program and outputs unscrambled program 209 for display on television 220.

IRD 206 is coupled to public switched telephone network 207. The telephone network is coupled to a phone processor 208 for receiving calls initiated by the IRDs in the network. The phone processor may comprise, for example, a Scientific Atlanta Model 8554-001 Phone Processor, available from the assignee of the present application. A current implementation utilizes eight model 8554-001 processors to handle incoming calls. A phone manager computer 209 such as a Compaq ® SystemPro ™ controls phone processor 208.

Phone manager computer 209 is coupled to business system computer 210 for compiling and processing billing information to bill subscribers. Phone manager 209 is also coupled to a subscriber authorization computer (SAC) 211 which controls, for example, the authorization of subscribers to receive particular programming. Subscriber authorization computer 211 contains information such as program tiers for a current month, credit limits, service tiers, call-in billing group, call-in time zone, call-in phone number, and store and forward disable for decoders in the network. Subscriber authorization computer 211 is coupled to MAC encoder 201 to permit communication between computer 211 and the IRDs in the network over satellite link 205. Finally, a system supervisory control computer 212 coupled to phone manager 209 and MAC encoder 201 controls the overall operation of the system.

Data or commands are transmitted to decoders in the network over satellite link 205 in at least two ways. In a first way, system data generated by supervisory control computer 212 carries program specific data for the channel currently tuned by a decoder. In a second way, addressed data packets (ADPs) are used to deliver decoder specific information to a single decoder. Each decoder in the network is assigned a unique user address and a secret serial number (SSN). When an addressed packet with an address matching the user address of a decoder is received, the packet is decrypted with the SSN. The packets preferably include a checksum which is used to verify both correct reception and decryption with a matching SSN. Typically, system data originates from supervisory control computer 212 as noted, while addressed data packets originate from subscriber authorization computer 211, although the invention is not limited in this respect.

Figure 11:
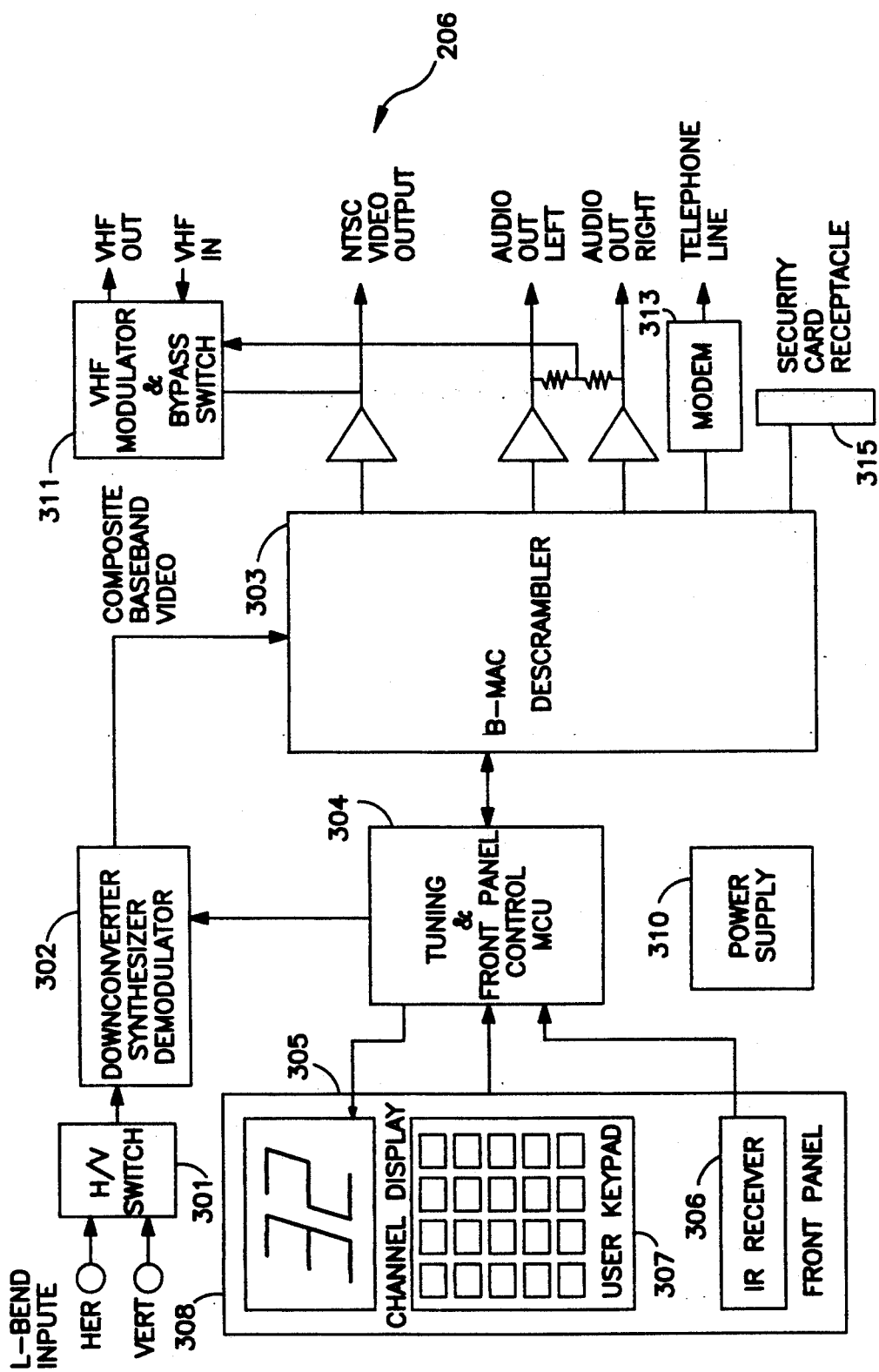
FIG. 11 is a block diagram of the integrated receiver decoder of FIG. 10.

FIG. 11 is a block diagram of B-MAC IRD 206 shown in FIG. 10. H/V switch 301 switches between the horizontal and vertical polarities of the incoming transmission over satellite link 205. The incoming signal then passes to block 302 including a downconverter, a tuner, and demodulator. The downconverter and tuner select a channel from the incoming signal and lower it to some intermediate frequency (IF). The tuner may, for example, comprise a synthesized tuner. The demodulator demodulates the signal to generate composite baseband video which is input into B-MAC decoder 303. Front panel 305 includes an IR receiver 306, user keypad 307, and LED display 308. IR receiver 306 is adapted to receive control signals from an associated IR remote control (not shown). User keypad 307 includes a plurality of keys 310 for permitting the subscriber to input, for example, channel selections and volume control. LED display 308 displays the tuned channel and may display other information such as time. Power supply 310 supplies power to IRD 206.

A tuning and front panel control processor 304 may comprise a MC68HC05C4 and tunes the transponder tuner in block 302, scans front panel keypad 307 and any remote keypads for keystrokes, drives LED display 308 and provides volume control. Keystroke interpretation is generally performed by display control processor (DCP) 405 (see FIG. 12), except for volume control, which is internal to tuning processor 304. Volume control keystrokes are passed to DCP 405, but function only to instruct DCP 405 to un-mute audio.

B-MAC decoder 303 decodes the composite baseband video input thereto and outputs NTSC video and audio as shown. VHF modulator 311 modulates the video and audio outputs of B-MAC decoder 303 for reception by television receiver 220 (FIG. 10). Modem 313 allows IRD 206 to interface with the public switched telephone network to permit communication between IRD 206 and a system operator. For example, billing information related to impulse pay-per-view purchases may be transferred to the system operator. Alternatively, information from the cable operator may be transferred to IRD 206 over the telephone network. B-MAC decoder 303 is also coupled to a security card receptacle 315 for receiving an insertable security card. A description of the insertable security card and its operation are described in commonly assigned copending application Ser. No. 07/677,460 filed concurrently herewith and entitled "Independent External Security Module For A Digitally Upgradeable Television Signal Decoder", which is incorporated herein by reference.

Figure 12:
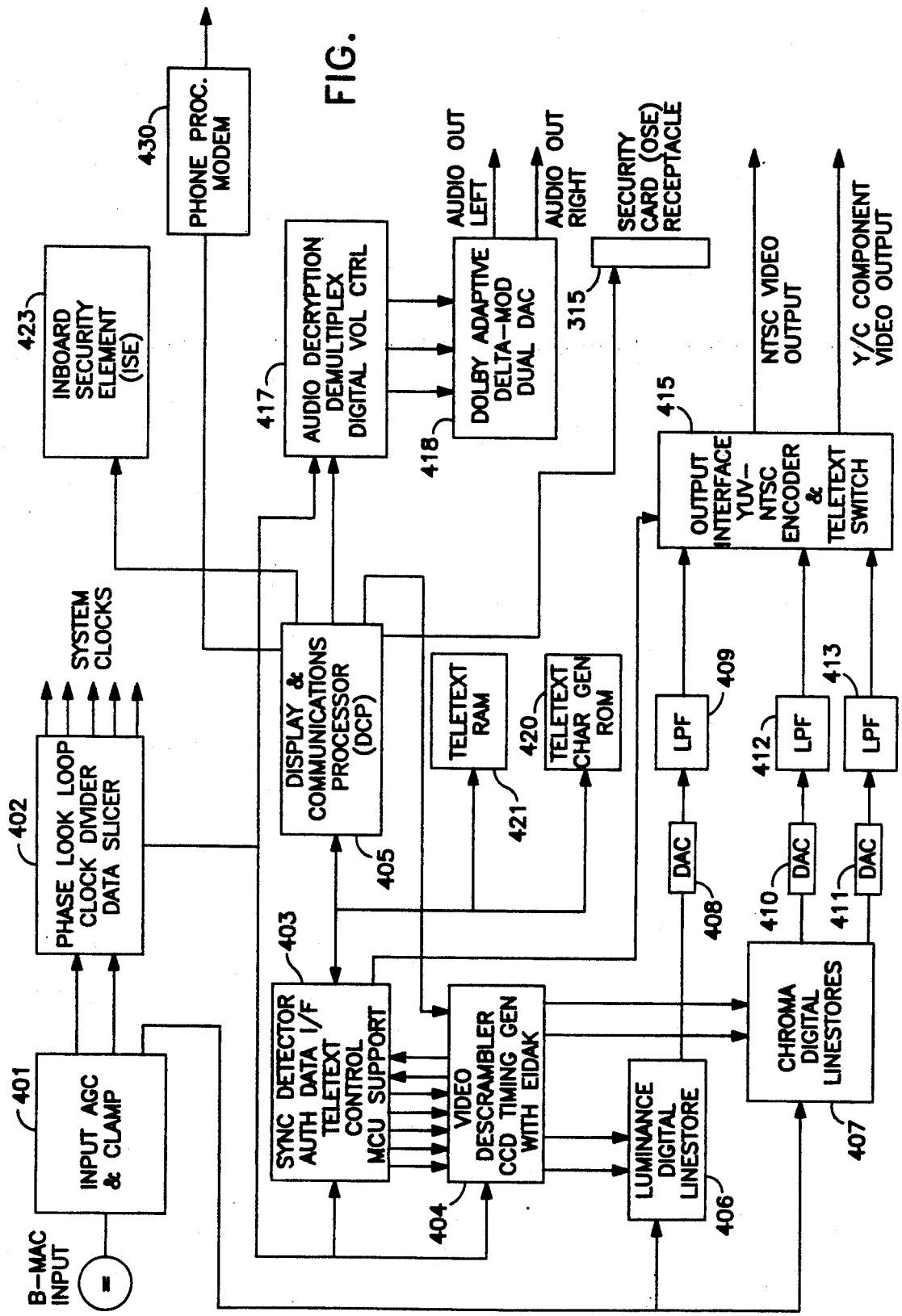
FIG. 12 is a block diagram of the descrambler shown in FIG. 11.

FIG. 12 is a detailed block diagram of B-MAC descrambler 303 of FIG. 11. The baseband B-MAC signal is input to AGC and clamping block 401 for performing well-known gain control and clamping operations. Block 402 includes a phase lock loop and a clock divider for generating system clock signals used in decoder operation. Attention is directed to U.S. Pat. No. 4,652,903, assigned to the assignee of the present application and incorporated herein by reference, for a description of a technique of generating clock signals. Block 402 also includes a data slicer for providing data contained in the incoming signal to microprocessor and teletext support interface (MATS) 403 and video descrambler 404. MATS 403 performs data error correction and data formatting on both incoming system data and addressed data packets and supplies the corrected and formatted data to display and communications processor (DCP) 405. DCP 405 may comprise a MC68HC11E9 and performs overall control of the other processors of decoder 303 and of all user interfaces.

The luminance and chrominance signals of the B-MAC signal are respectively provided to luminance digital linestore 406 and chrominance digital linestore 407. The decompressed luminance signal is provided to digital-to-analog converter 408 and then to low pass filter 409, where it is filtered. The analog luminance signal then goes to output interface 415. The sampling signals necessary to decompress luminance are produced by a timing generator in block 404 and supplied to luminance digital linestore 406 by clock drivers.

The chrominance signal is decompressed in digital chrominance store 407. Separate outputs are provided for the two color difference signals, which are passed through respective digital-to-analog converters 410 and 411. The color difference signals are then respectively passed through low pass filters 412 and 413, where they are filtered. The filtered signals are provided to output interface 415. The necessary sampling signals are supplied to chrominance store 407 from a timing generator in block 404 through clock drivers. Audio information is provided to block 417 including an audio decryptor, a demultiplexor and a digital volume control. The audio information then passes to block 418 including a Dolby ® adaptive delta modulation demodulator, and a digital-to-analog converter. Teletext character generator ROM 420 and teletext RAM 421 are coupled to DCP 405 and MATS 407 for providing teletext characters to output interface 415 in accordance with teletext information contained in the incoming B-MAC signal. Output interface 415 outputs a standard NTSC video output. DCP 405 is also coupled to inboard security element (ISE) 423 and receptacle 315 for receiving an outboard security element (OSE). The ISE and OSE and their operation are discussed in detail in the above-identified copending application Ser. No. 07/677,460. Generally, only one of the ISE or OSE is active at a given time. Finally, DCP 405 is coupled to a phone processor 430 for interfacing the decoder and the public switched telephone network. Phone processor 430 may comprise a MC68HC05C4 and controls modem communication and tone generation. Since the modem transfers billing information representing revenue to the cable operator, telephone communications are preferably encrypted for security. The encryption takes place in one of ISE 423 or the OSE processors (whichever is active) before being passed to the modem. If the modem is utilized to receive information, such information is passed on verbatim to ISE 423 or the OSE. The active security element may initiate a call when commanded by system data or by an addressed data packet. The inactive security element may initiate a call only when commanded by an addressed data packet.

To improve the interface between the system and a subscriber, the present invention uses a plurality of virtual channels wherein each transponder channel is associated with one or more virtual channels. A virtual channel refers to a channel which is selected by a subscriber for viewing and/or listening and whose channel number is displayed on channel display 308 of front panel 305. These features are illustrated with reference to FIG. 13. When a subscriber selects virtual channel 001 on his decoder, a superstation and accompanying audio in a first language, transmitted over transponder channel 4, are provided. When a subscriber selects virtual channel 002 on his decoder, sports and accompanying audio in a first language, transmitted over transponder channel 9, are provided. When a subscriber selects virtual channel 006 on his decoder, music videos and accompanying audio in a first language, transmitted over transponder channel 7, are provided. When a subscriber selects virtual channel 010 on his decoder, pay-per-view first run movies and accompanying audio in a first language, transmitted over transponder channel 3, are provided.

When a subscriber selects virtual channel 024 on his decoder, sports and accompanying audio in a second language, transmitted over transponder channel 9, are provided. As noted above, virtual channel 002 also utilizes video and audio information transmitted over transponder channel 9. However, while virtual channels 002 and 024 have the same video, each virtual channel uses different ones of the audio channels available on transponder channel 9. Transponder channel 9 includes video and accompanying audio in both first and second languages. By the use of virtual channels, the video and the accompanying audio in the first language appear on a first virtual channel and the same video and the accompanying audio in the second language appear on a second virtual channel. Thus, a subscriber merely has to tune his decoder to the appropriate virtual channel to receive the desired services. As can be seen, a single transponder channel may be utilized to create a plurality of virtual channels.

Likewise, when a subscriber selects virtual channel 026 on his decoder, PPV first run movies and accompanying audio in a second language, transmitted over transponder channel 3, are provided. As noted above, virtual channel 010 also utilizes video and audio information transmitted over transponder channel 3. However, while virtual channels 010 and 026 have the same video, each virtual channel uses different ones of the audio channels available on transponder channel 3. Again, the implementation of virtual channels enables video and accompanying audio in the first language to appear on a first virtual channel and the same video and accompanying audio in the second language to appear on a second virtual channel.

When a subscriber selects virtual channel 046 on his decoder, classical music in stereo on a first radio channel of transponder channel 9 is provided. When a subscriber selects virtual channel 047 on his decoder, country music in stereo on a first radio channel of transponder channel 4 is provided. When a subscriber selects virtual channel 048 on his decoder, a call-in talk show in mono on a second radio channel of transponder channel 4 is provided.

Text services may also be provided. When a subscriber selects virtual channel 094 on his decoder, a text page 164 related to the weather in southern California, transmitted over transponder channel 3, may be displayed. When a subscriber selects virtual channel 095 on his decoder, a text page 192 related to the weather in the New York City area, transmitted over transponder channel 3, may be displayed. Finally, when a subscriber selects virtual channel 099 on his decoder, a text page 225 related to stock market tips, transmitted over transponder channel 8, may be displayed. Enhancements to the user for text screens will be discussed in greater detail below.

Additionally, one or more virtual channels may be dedicated to utility data for use, for example, by a personal computer.

The present invention is implemented through the use of a channel map as illustrated in FIG. 14. Whenever the subscriber selects a virtual channel via keypad 307 or a keypad of an IR remote, DCP 405 searches the channel map stored in an associated non-volatile memory to determine the characteristics of the selected virtual channel. The channel map is sent to the decoder via system data or an addressed data packet. In a presently preferred embodiment, the channel map consists of 256 locations in non-volatile memory, althrough the invention is not limited in this respect. One memory location is associated with each virtual channel and contains information defining the characteristics of the virtual channel. To define these characteristics, each of the memory locations includes the corresponding transponder channel number, the service type (e.g. television, text, radio, data), a service qualifier such as Language #1 or Language #2 for TV or which ones of the available audio channels is used for radio, and a disable bit. If the disable bit is set, a subscriber cannot select that virtual channel. Thus, with reference to FIG. 14, a subscriber would be unable to select virtual channels 003, 004, and 005 and pressing an increment channel key when virtual channel 002 is currently selected would select virtual channel 006. It is also contemplated that digital B-MAC may be implemented in the present system as described in commonly assigned copending Application Ser. No. 07/677,460 entitled "Independent External Security Module For A Digitally Upgradeable Television Signal Decoder", filed concurrently herewith and incoporated herein by reference. If so, each location of non-volatile memory further includes a sub-transponder number.

Teletext feature of the invention permits ease of movement through a large number of text screens, such as may be associated with stock market listings. For example, one hundred text pages may be required for the display of stock market listings. It is inconvenient and extremely time consuming for a subscriber to repeatedly depress the "NEXT" key to reach a text screen displaying, for example, information concerning stocks beginning with the letter "R". One alternative would be to assign each text page of stock market listings its own virtual channel. Wile this overcomes the problem of a subscriber having to repeatedly actuate his "NEXT" key, a large number of virtual channels is required. To overcome these difficulties, the present invention implements text root pages. A text root page is a starting page number for a linked sequence. A root page spacing value defines a number of linked pages between root pages.

In accordance with this principle, the stock market listings may be displayed on a plurality of virtual channels, each virtual channel beginning with a text root page and having a number of linked pages determined by the root spacing value. For example, the stock market listings may be displayed on virtual channels 85-94 as shown in FIG. 15. The root page for virtual channel 85 is 0, the root page for channel 86 is 10, the root page for channel 87 is 20, and so forth. The root page spacing value is therefore ten. Thus, each virtual channel includes ten text pages of market listings. Each channel may be associated with stocks beginning with certain letters. For example, stocks beginning with the leters A–C may be on channel 85, stocks beginning with D–F on channel 86, and so forth. It can easily be seen that a subscriber may simply refer to a program guide and determine that stock market listings for stocks beginning with the letters R-S are found on channel 91. No complex menus and key sequences are required to provide the subscriber with desired information. The listings need not be broken down as shown. For example, one virtual channel could be dedicated to the Dow Jones Industrials and another to the most active stocks.

Virtual channels may be authorized or unauthorized for particular decoders. For example, video can be authorized for a number of reasons:
(1) Tier bit matches
(2) A program has been bought locally, i.e., using impulse pay-per-view
(3) A program was bought previously i.e., via phone call to headend
(4) A program is allowed free time and was selected
(5) A program is granted preview time
(6) Encryption is off The purchase of programming such as impulse pay-per-view programming is described in commonly assigned copending application Ser. No. 07/677,689 entitled "Data Return For A Television Transmission System," incoporated herein by reference. Exemplary impulse pay-per-view systems are described, for example, in U.S. Pat. Nos. 4,163,254 and 4,225,884 to Block, incorporated herein by reference. The concepts of preview time and free time are discussed in commonly assigned, U.S. Pat. No. 5,003,384, incororated herein by reference. The concept of tiering is described in U.S. Pat. No. 4,484,217 to Block, incorporated herein by reference, and refers to the payment of a flat fee for each tier or category of programming desired. The eligibility of a subscriber to watch certain tiers is determined by the subscriber authorization computer and the subscriber is generally charged a flat fee for that eligibility regardless of how many or few programs within the tier are watched.

Video can be deauthorized for a number of reasons including the following:
(1) One of the authorized condition isn't true
(2) The key of the month doesn't match
(3) Free time has expired Authorized video may include the following operating modes:
(1) Language 1 or 2 captions
(2) Preview or free time messages displayed
(3) A general message is being displayed Radio and reassigned data services are authorized when the corresponding service tier bit is set and the key of the month matches. If authorized, then a specific text page is displayed describing the service tuned to. If not authorized, there is a page displayed to indicate this condition.

The text service is allowed if the key of the month matches and the appropriate service tier bit is set. If not authorized, the "Text Service Not Authorized" page is displayed.

The invention also includes a feature which allows for disaster recovery in case of a loss of the virtual channel map or an error in a downloaded map. If there is no MAC signal supplied to the decoder, it is assumed that the virtual channel map is corrupted. The decoder then begins to search for any valid MAC channel with a virtual channel map being downloaded. This hunt feature is only initiated if the decoder is in the "logical power off" state. The hunting preferably starts approximately two minutes of loss of the MAC on the homing channel, since the decoder tunes to the homing channel with power off.

The first HUNT channel is transponder 0, sub-channel 0. Every 5 seconds the sub-channel is incremented from 0 up to 7. Next, the sub-channel returns to 0 and the transponder number is incremented. This incrementing continues until a valid consumer MAC channel is found, or until the logical power is applied. Since there are 256 possible channels, the decoder will hunt through all channels in 1280 seconds (21 minutes, 20 seconds). The sequence is then repeated from channel 0, sub-channel 0.

To check for errors in a downloaded channel map, a diagnostic text screen may be provided which displays, inter alia, a checksum of the entire virtual channel map to aid in detection and diagnosis of faulty units. Further, when the system operator changes a channel map, it is not necessary to transmit an entirely new map. If desired, only the characteristics of those channels which have changed need be transmitted.

It can be seen that the use of virtual channels promotes increased flexibility with respect to the features of a MAC signal. They allow a wide range of services to be provided to subscribers through a user friendly interface. Since the channel map is in non-volatile memory of the decoder, the system operation is not visible to a subscriber, who must merely consult a program guide and tune a desired channel.

All of the applications and patents identified above are incorporated herein by the respective references thereto.

Although illustrative embodiments of the present invention have been described in detail with reference to the accompanying drawings, it is to be understood that the invention is not limited to those precise embodiments and that various changes and modifications may be effected therein by those in the art without departing from the scope and spirit of the invention.

We claim:

1. A decoder for use in a television system, said decoder comprising:
   a receiver for receiving a television signal including a linked sequence of text pages wherein each text page is accompanied by information identifying the next text page in the linked sequence of text pages;
   a memory for storing a channel map for mapping the linked sequence of text pages to a plurality of virtual channels, each virtual channel having text pages of the linked sequence of text pages mapped thereto in accordance with root text pages defining a first text page on each of said virtual channels and root page spacings defining a number of text pages mapped to each of said virtual channels, a final text page of a first virtual channel linked to the root text page of a second virtual channel; and
   a selector for selecting ones of said virtual channels to display the linked sequence of text pages in accordance with the channel map stored in said memory.

2. An encoder for transmitting a linked sequence of text pages to a plurality of remotely located decoders, said encoder comprising:
   means for generating a channel map for mapping the linked sequence of text pages to a plurality of virtual channels, each virtual channel having text pages of the linked sequence of text pages mapped thereto in accordance with root text pages defining a first text page on each virtual channel and root page spacings defining a number of text pages mapped to each virtual channel, a final text page of a first virtual channel linked to the root text page of a second virtual channel; and
   a transmitter for transmitting a television signal comprising the linked sequence of text pages and the channel map to said remotely located decoders.

3. The decoder according to claim 1, wherein said memory is a non-volatile memory.

4. The decoder according to claim 1, wherein said memory stores a channel map in which each virtual channel has the same number of linked text pages mapped thereto.

5. A television system for transmitting and displaying a linked sequence of text pages, comprising:
   an encoder including:
      means for generating a channel map for mapping the linked sequence of text pages to at least two virtual channels, each virtual channel having text pages of the linked sequence of text pages mapped thereto in accordance with root text pages defining a first text page on each virtual channel and root page spacings defining a number of text pages mapped to each virtual channel, a final text page of a first virtual channel linked to the root text page of a second virtual channel; and
      a transmitter for transmitting a television signal comprising the linked sequence of text pages and the channel map; and
   a decoder comprising:
      a receiver for receiving the television signal;
      a memory coupled to said receiver for storing the channel map; and
      a selector for selecting ones of the virtual channels to display the linked sequence of text pages in accordance with the channel map stored in said memory.

6. The television system according to claim 5 wherein each page of the linked sequence is accompanied by information identifying the next page in the sequence.

7. The television system according to claim 5 wherein said selector includes means for sequentially selecting text pages of the linked sequence of text pages.

8. A method of transmitting a linked sequence of text pages to a plurality of decoders in a television system, comprising the steps of:
   generating a channel map for mapping the linked sequence of text pages to at least two virtual channels, each virtual channel having text pages of the linked sequence of text pages mapped thereto in accordance with root text pages defining a first text page on each virtual channel and root page spacings defining a number of text pages mapped to each virtual channel, a final text page of a first virtual channel linked to the root text page of a second virtual channel; and
   transmitting a television signal comprising the linked sequence of text pages and the channel map.

9. A method of displaying a linked sequence of text pages transmitted with a television signal in a television system, the method comprising the steps of:
   storing a channel map mapping the linked sequence of text pages to at least two virtual channels, each virtual channel having text pages of the linked sequence of text pages mapped thereto in accordance with root text pages defining a first text page on each virtual channel and root page spacings defining a number of text pages mapped to each virtual channel, a final text page of a first virtual channel linked to the root text page of a second virtual channel; and selecting ones of the virtual channels to display the linked sequence of text pages in accordance with the stored channel map.

* * * * *